United States Patent
Lu et al.

(10) Patent No.: US 11,377,249 B2
(45) Date of Patent: Jul. 5, 2022

(54) LABELING SYSTEM AND LABELING METHOD

(71) Applicants: Tyco Electronics (Shanghai) Co. Ltd., Shanghai (CN); TE Connectivity Services GmbH, Schaffhausen (CH)

(72) Inventors: Roberto Francisco-Yi Lu, Bellevue, WA (US); Yingcong Deng, Shanghai (CN); Dandan Zhang, Shanghai (CN); Lvhai Hu, Shanghai (CN); Zongjie Tao, Shanghai (CN)

(73) Assignees: TE Connectivity Services GmbH, Schaffhausen (CH); Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 17/084,002

(22) Filed: Oct. 29, 2020

(65) Prior Publication Data
US 2021/0130028 A1    May 6, 2021

(51) Int. Cl.
*B65C 9/40*    (2006.01)
*B65C 9/02*    (2006.01)
*B65C 1/02*    (2006.01)
*B65C 9/26*    (2006.01)

(52) U.S. Cl.
CPC .................. *B65C 9/40* (2013.01); *B65C 1/02* (2013.01); *B65C 9/02* (2013.01); *B65C 9/26* (2013.01); *B65C 2009/407* (2013.01); *B65G 2203/042* (2013.01); *B65G 2203/044* (2013.01)

(58) Field of Classification Search
CPC ... B65C 1/021; B65C 1/023; B65C 2009/407; B65C 9/04
See application file for complete search history.

(56) References Cited

U.S. PATENT DOCUMENTS 5,501,571 A * 3/1996 Van Durrett ....... G05B 19/4189
    414/801
2020/0055094 A1* 2/2020 de Bruijn .................. B07C 5/36

* cited by examiner

*Primary Examiner* — Carson Gross
(74) *Attorney, Agent, or Firm* — Barley Snyder

(57) ABSTRACT

A labeling system includes a pasting unit having a first mechanical arm adapted to pick up a label to be pasted, at least one visual device configured to guide the first mechanical arm to paste the label on an object, and at least one scanning device adapted to scan the label pasted on the object.

13 Claims, 3 Drawing Sheets

LABELING SYSTEM AND LABELING METHOD

CROSS-REFERENCE TO RELATED APPLICATION

This application claims the benefit of the filing date under 35 U.S.C. § 119(a)-(d) of Chinese Patent Application No. 201911057384.X, filed on Oct. 31, 2019.

FIELD OF THE INVENTION

At least one embodiment of the present disclosure relates to a labeling system and, more particularly, to a labeling system for pasting a label on an object.

BACKGROUND

Labeling is one of the key processes for delivering packages/boxes to users. There are usually different labels for different users. At present, labeling is mainly done manually, so the work efficiency is low. In addition, the labels are usually randomly pasted on the packages/boxes, and thus the labeling positions and orientations are inconsistent, which complicates label identification and further decreases efficiency.

SUMMARY

A labeling system includes a pasting unit having a first mechanical arm adapted to pick up a label to be pasted, at least one visual device configured to guide the first mechanical arm to paste the label on an object, and at least one scanning device adapted to scan the label pasted on the object.

BRIEF DESCRIPTION OF THE DRAWINGS

The invention will now be described by way of example with reference to the accompanying Figures, of which.

DETAILED DESCRIPTION OF THE EMBODIMENT(S)

Although the present disclosure will be fully described with reference to the accompanying drawings including embodiments of the disclosure, before the description, it should be understood that modifications may be made to the invention described herein by those of ordinary skill in the art while still obtaining the technical effects of the disclosure. Therefore, the description is to be understood as a broad disclosure for those of ordinary skill in the art, and is not intended to be limited to the exemplary embodiments described herein.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
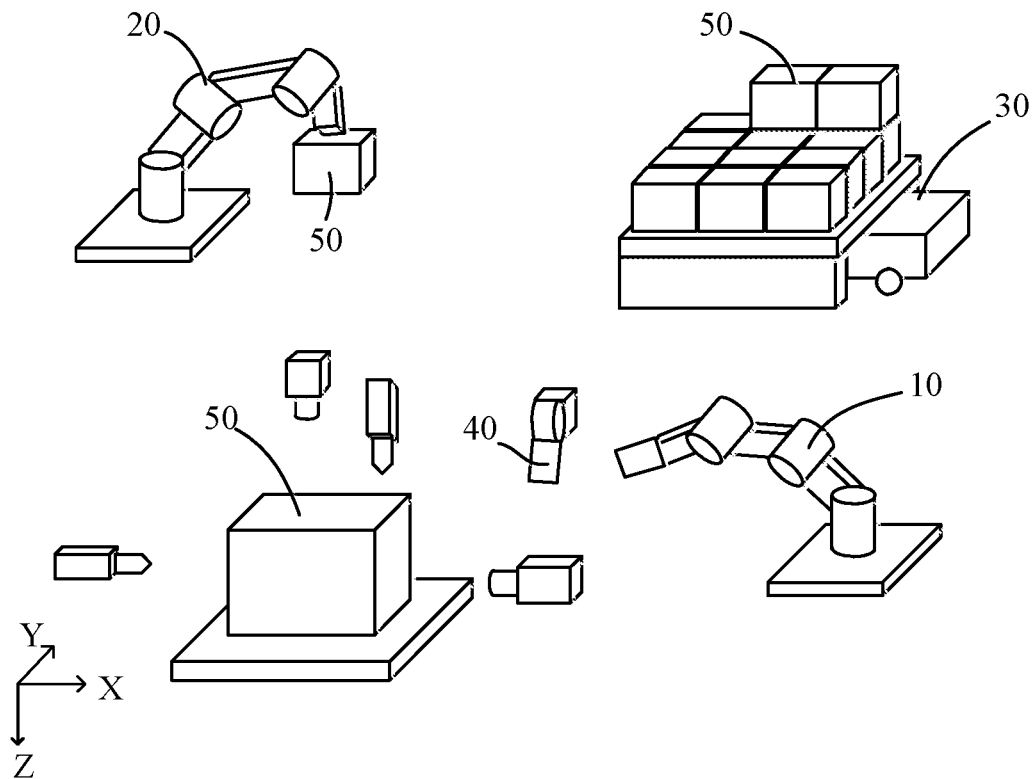
FIG. 1 is a schematic perspective view of a labeling system according to an embodiment.
Figure 2:
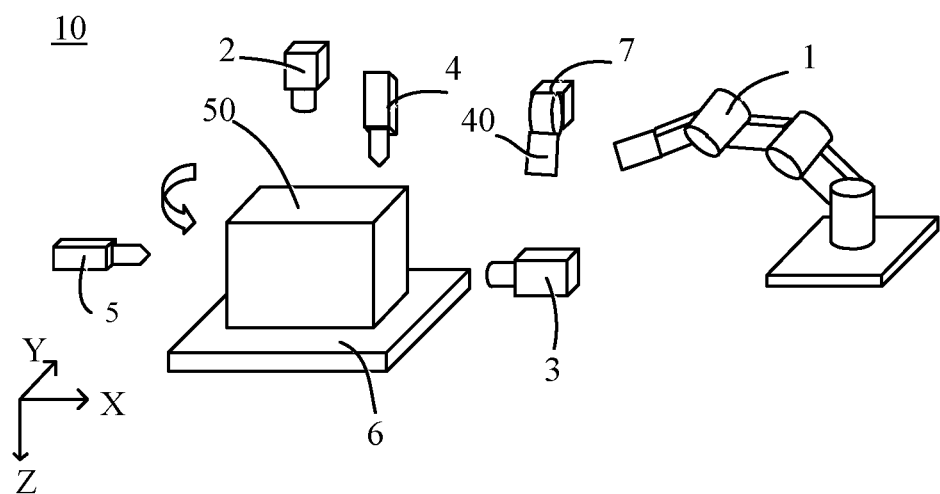
FIG. 2 is a schematic perspective view of a pasting unit of the labeling system.

A labeling system according to an embodiment, as shown in FIGS. 1 and 2, comprises a pasting unit 10 including a first mechanical arm 1, a pair of visual devices 2, 3, and a pair of scanning devices 4, 5.

The first mechanical arm 1 is adapted to pick up a label 40 to be pasted. The visual devices 2, 3 are configured to guide the first mechanical arm 1 to paste the picked up label 40 on an object 50. More specifically, the visual devices 2, 3 may be configured to guide the first mechanical arm 1 to paste the picked up label 40 at a predetermined position of the object 50 in a predetermined pasting orientation. The predetermined position may be a position located at a top surface and/or side surface of the object 50, and the predetermined pasting orientation refers to a orientation of the label 40 pasted on the object 50. It should be noted that the predetermined position and the predetermined pasting orientation may be flexibly set according to requirements of users. The scanning devices 4, 5 are adapted to scan the label 40 pasted on the labeled object 50, and the label 40 is printed with a bar code or other mark that may identify a corresponding object. The scanning devices 4, 5 may be, for example, readers capable of reading the bar code or the mark.

In an exemplary embodiment, as shown in FIGS. 1 and 2, the visual devices 2, 3 are further configured to identify whether there is a label 40 pasted on the object 50, and to guide the scanning devices 4, 5 to scan the label 40 when the visual devices 2, 3 identifies that there is the label 40 pasted on the object 50.

In an exemplary embodiment, as shown in FIGS. 1 and 2, the visual devices 2, 3 include a first visual device 2 configured to identify whether there is a label 40 pasted on the top surface of the object 50, and to guide the scanning device 4 to scan the label 40 on the top surface of the object 50 when the first visual device 2 identifies that there is the label 40 pasted on the top surface of the object 50. The visual devices 2, 3 include a second visual device 3 configured to identify whether there is a label 40 pasted on the side surface of the object 50, and to guide the scanning device 5 to scan the label 40 on the side surface of the object 50 when the second visual device 3 identifies that there is the label 40 pasted on the side surface of the object 50.

It will be appreciated by those skilled in the art that in some other embodiments of the present disclosure, only one of the first visual device 2 and the second visual device 3 may be provided. In addition, the first visual device 2 or the second visual device 3 may perform three-dimensional movement so as to guide the first mechanical arm 1 to paste the label on the object 50 by only one visual device, which may reduce the number of components and reduce the manufacturing cost. Of course, in some other embodiments of the present disclosure, more than two visual devices may also be used.

The scanning device 4, 5, as shown in FIGS. 1 and 2, include a first scanning device 4 that is located above the object 50 and is configured to scan the label 40 pasted on the top surface of the object 50. The scanning devices 4, 5 include a second scanning device 5 that is located at the side of the object 50 and is configured to scan the label 40 pasted on the side surface of the object 50.

In an exemplary embodiment, as shown in FIGS. 1 and 2, the first scanning device 4 is movable in a horizontal plane XY so as to scan the labels 40 located at different horizontal positions on the objects 50, thereby improving the scan accuracy. Specifically, when the label 40 is, for example, located at the center of the top surface of the object 50, the first scanning device 4 is moved in the horizontal plane XY to be directly above a position where the label 40 is located, so as to accurately scan the label 40. The second scanning device 5 is movable in a vertical plane YZ, so as to scan the labels 40 located at different height positions on the objects 50, thereby improving the scan accuracy. Specifically, when the label 40 is, for example, located at a lower part of the side surface of the object 50, the second scanning device 5 is moved in the vertical plane YZ to be directly aligned with the position of the label 40, so as to accurately scan the label 40.

It will be appreciated by those skilled in the art that in some other embodiments of the present disclosure, only one of the first scanning device 4 and the second scanning device 5 may be provided. In addition, the first scanning device 4 or the second scanning device 5 may also perform three-dimensional movement, so as to scan the label 40 located on the top surface and/or the side surface of the object 50 by only one scanning device, thereby reducing the number of components and reducing the manufacturing cost. Of course, more than two scanning devices may also be used.

In an exemplary embodiment, as shown in FIGS. 1 and 2, the labeling system further comprises a movable platform 6 configured to carry the object 50 and to move the object 50 to a pasting position, at which the first mechanical arm 1 pastes the label 40 on the object 50 under the guidance of the at least one visual device 2, 3. In an exemplary embodiment, the movable platform 6 is rotatable so that the side surface of the object 50 on which the label 40 is pasted is moved into a field of view of the second visual device 3 and a scanning range of the second scanning device 5. Specifically, in this embodiment, the side surface of the object 50 on which the label 40 is to be pasted may be moved into the field of view of the second visual device 3 by rotating the movable platform 6, so that the second visual device 3 guides the first mechanical arm 1 to paste the label on this side surface. In this way, the labeling system may be applied to the objects 50 that are loaded on the movable platform 6 in different orientations.

In an exemplary embodiment, as shown in FIGS. 1 and 2, the side surface of the object 50 on which the label 40 is pasted may be moved into the field of view of the second visual device 3 by rotating the movable platform 6, so as to identify whether there is the label 40 pasted on this side surface by the second visual device 3. When it is identified that there is the label 40 pasted on this side surface, the label 40 is scanned by the second scanning device 5. When it is identified that there is no label 40 pasted on this side surface, a corresponding label 40 is re-pasted on this side surface by the first mechanical arm 1. Further, the side surface of the object 50 on which the label 40 is pasted may be moved into the scanning range of the second scanning device 5 by rotating the movable platform 6, so as to scan the label by the second scanning device 5. As shown in FIGS. 1 and 2, the second visual device 3 and the second scanning device 5 are located on opposite sides of the object 50. However, it should be noted that the second visual device 3 and the second scanning device 5 may also be located on the same side or adjacent sides of the object 50.

In an exemplary embodiment, as shown in FIGS. 1 and 2, the labeling system further comprises a printer 7 configured to print different types of labels 40 to meet different requirements of the user. The printer 7 may be, for example, a digital printer.

Figure 3:
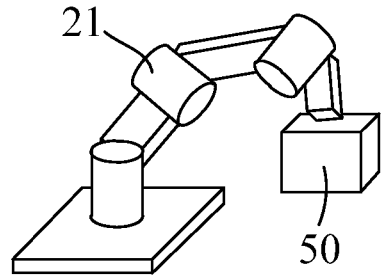
FIG. 3 is a schematic perspective view of a stacking unit of the labeling system.

In an exemplary embodiment, as shown in FIGS. 1 and 3, the labeling system further comprises a stacking unit 20. The stacking unit 20 has a second mechanical arm 21 configured to remove the scanned object 50 from the pasting position, so as to move another object 50 to the pasting position by the movable platform 6 to perform the label pasting operation on the another object 50.

Figure 4:
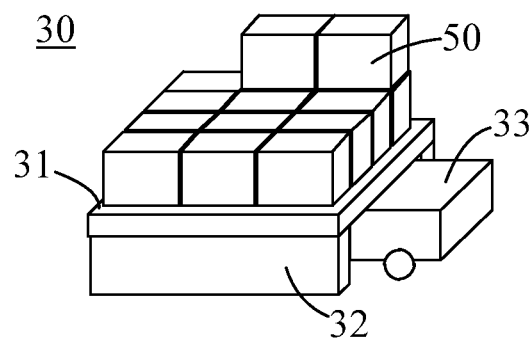
FIG. 4 is a schematic perspective view of a transporting unit of the labeling system.

In an exemplary embodiment, as shown in FIGS. 1 and 4, the labeling system further comprises a transporting unit 30 including a pallet 31 on which the second mechanical arm 21 stacks the object 50. The transporting unit 30 has a pallet supporting frame 32 configured to support the pallet 31, so as to insert a portion of a transporting vehicle 33 under the pallet 31 to transport the pallet 31 along with the object 50 on the pallet 31. The transporting vehicle 33 may be, for example, an automatic guided vehicle (AGV).

It will be appreciated by those skilled in the art that, in various embodiments of the present disclosure, the object 50 may be a box, a container, or a package that is suitable for pasting the label thereon, and so on.

Figure 5:
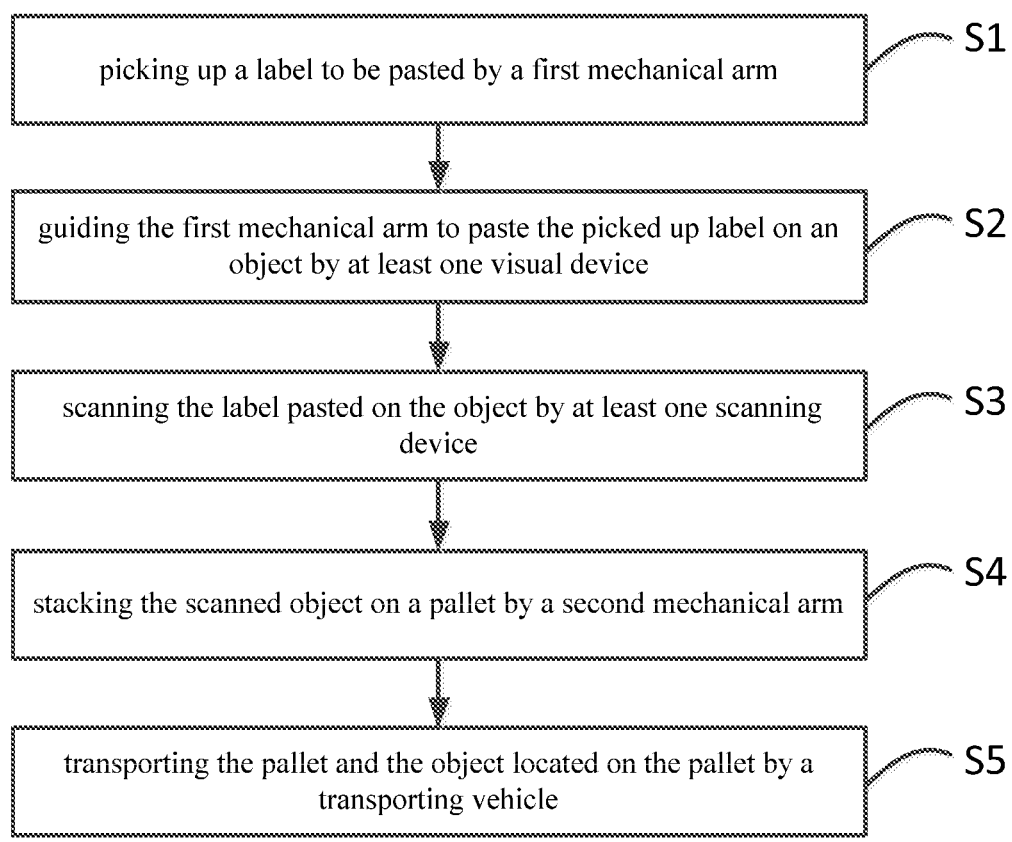
FIG. 5 is a flowchart of a labeling method according to an embodiment.

In an embodiment, as shown in FIG. 5, a labeling method is also provided, and the method comprises following steps:

S1: picking up the label 40 to be pasted, the label 40 being for example, printed from the printer 7 by the first mechanical arm 1;

S2: guiding the first mechanical arm 1 to paste the picked up label 40 on the object 50 by at least one visual device 2, 3; and S3: scanning the label 40 pasted on the object 50 by at least one scanning device 4, 5.

In an exemplary embodiment, as shown in FIG. 5, the labeling method further comprises a step S4 of stacking the scanned object 50 on the pallet 31 by the second mechanical arm 21.

In an exemplary embodiment, as shown in FIG. 5, the labeling method further comprises a step S5 of transporting the pallet 31 and the object 50 located on the pallet 31 by the transporting vehicle 33.

The labeling system and the labeling method described according to the above various embodiments of the present disclosure pastes the label 40 on the object 50 by the first mechanical arm 1 under the guidance of the visual device 2, thereby achieving the automation of labeling, and thus the labor is saved and the pasting position and orientation may be adjusted according to the requirements of the users. In addition, the side surface of the object 50 on which a label 40 is to be pasted may be moved into the field of view of the second visual device 3 by rotating the movable platform 6, so that the second visual device 3 guides the first mechanical arm 1 to paste the label 40 on this side surface. In this way, the labeling system may be applied to the objects 50 that are loaded on the movable platform 6 in different orientations.

It will be understood by those skilled in the art that the above-described embodiments are exemplary and that modifications may be made by those skilled in the art, and that structures described in the various embodiments may be freely combined without conflict in structure or principle.

Although the exemplary embodiments of the present disclosure have been described in detail, it will be apparent to those skilled in the art that various changes and modifications can be made without departing from the scope and spirit of the appended claims, and the disclosure is not limited to the exemplary embodiments illustrated in the specification.

What is claimed is:

1. A labeling system, comprising:
 a pasting unit including:
  a first mechanical arm adapted to pick up a label to be pasted
  and to paste the label on a side surface or a top surface of an object;
  a first scanning device adapted to scan the label if it is pasted on the top surface of the object;
  a second scanning device adapted to scan the label if it is pasted on the side surface of the object; and
  a movable platform configured to carry the object, the movable platform is rotatable for rotating the side surface of the object into a scanning range of the second scanning device.

2. The labeling system of claim 1, further comprising a printer configured to print different types of labels.

3. A labeling system comprising:
 a pasting unit including:
  a first guided mechanical arm adapted to pick up a label to be pasted and to paste the label on one of a top surface or a side surface of an object;
  a first scanning device, if the label is detected on the top surface, the first scanning device adapted to scan the label pasted on the top surface of the object;
  a second scanning device, if the label is detected on the side surface, the second scanning device adapted to scan the label pasted on the side surface of the object, wherein the first scanning device is movable in a horizontal plane and the second scanning is movable in a vertical plane; and
  a movable platform configured to carry the object, the movable platform is rotatable to move the side surface of the object into a scanning range of the second scanning device.

4. The labeling system of claim 3, wherein the movable platform is configured to rotate the object to a pasting position at which the first mechanical arm pastes the label on the object.

5. The labeling system of claim 4, wherein the side surface of the object on which the label is pasted is moved into a scanning range of the second scanning device by the movable platform.

6. The labeling system of claim 4, further comprising a stacking unit including a second mechanical arm configured to remove the object from the pasting position.

7. The labeling system of claim 6, further comprising a transporting unit including a pallet on which the second mechanical arm stacks the object.

8. The labeling system of claim 7, wherein the transporting unit includes a pallet supporting frame supporting the pallet.

9. The labeling system of claim 8, wherein the transporting unit includes a transporting vehicle transporting the pallet and the object located on the pallet.

10. A labeling method, comprising:
 picking up a label to be pasted by a first mechanical arm;
 guiding the first mechanical arm to paste the label on one of a top surface or a side surface of an object;
 rotating the object on a movable platform to move the side surface of the object on which a label may be present into a scanning range of a first scanning device;
 if the label is pasted on the top surface, scanning the label pasted on the top surface of the object with a second scanning device; and
 if the label is pasted on the side surface, scanning the label pasted on the side surface of the object with the first scanning device.

11. The labeling method of claim 10, further comprising stacking the object on a pallet with a second mechanical arm.

12. The labeling method of claim 11, further comprising transporting the pallet and the object on the pallet with a transporting vehicle.

13. The labeling method of claim 10, further comprising:
 with the movable platform, moving the object into a pasting position at which the first mechanical arm pastes the label on the object.

* * * * *

UNITED STATES PATENT AND TRADEMARK OFFICE
CERTIFICATE OF CORRECTION

Page 1 of 1

PATENT NO. : 11,377,249 B2
APPLICATION NO. : 17/084002
DATED : July 5, 2022
INVENTOR(S) : Roberto Francisco-Yi Lu et al.

It is certified that error appears in the above-identified patent and that said Letters Patent is hereby corrected as shown below:

On the Title Page

Item (30) The Foreign Application Priority Data
Please insert the following:
--October 31, 2019 (CN)................CN 201911057384.X--

Signed and Sealed this
Twenty-first Day of February, 2023

Katherine Kelly Vidal
*Director of the United States Patent and Trademark Office*